US010289101B2

(12) United States Patent
Sillay et al.

(10) Patent No.: US 10,289,101 B2
(45) Date of Patent: May 14, 2019

(54) METHOD AND SYSTEM FOR CONTROLLING BODY-SHOP PROCESSING

(71) Applicant: Akzo Nobel Coatings International B.V., Arnhem (NL)

(72) Inventors: James M. Sillay, Alpharetta, GA (US); Kenneth S. Kirkwood, Englewood, CO (US); Robert M. Gilbert, Chardon, OH (US); Bartolomeus M. Jutte, Delft (NL)

(73) Assignee: Akzo Nobel Coatings International B.V. (NL)

( * ) Notice: Subject to any disclaimer, the term of this patent is extended or adjusted under 35 U.S.C. 154(b) by 224 days.

(21) Appl. No.: 15/456,152

(22) Filed: Mar. 10, 2017

(65) Prior Publication Data

US 2018/0259945 A1    Sep. 13, 2018

(51) Int. Cl.
*G05B 19/418* (2006.01)
*G06F 3/0484* (2013.01)
(Continued)

(52) U.S. Cl.
CPC ..... *G05B 19/41865* (2013.01); *G06F 3/0486* (2013.01); *G06F 3/04847* (2013.01);
(Continued)

(58) Field of Classification Search
CPC .... G05B 19/41865; G05B 2219/32128; G05B 2219/34379; G06F 3/04847; G06F 3/0486; G06F 3/0488
(Continued)

(56) References Cited

U.S. PATENT DOCUMENTS 6,941,519 B1 * 9/2005 Jerome ............ G05B 19/41865
715/744
2010/0100271 A1    4/2010 Nagalla et al.
(Continued)

FOREIGN PATENT DOCUMENTS

WO    2013/141798    9/2013

OTHER PUBLICATIONS

International Search Report and Written Opinion from International Application No. PCT/EP2018/055637, dated May 15, 2018.
(Continued)

*Primary Examiner* — Robert E Fennema
*Assistant Examiner* — Jigneshkumar C Patel
(74) *Attorney, Agent, or Firm* — McDonnell Boehnen Hulbert & Berghoff LLP; Nirav P. Patel (57) ABSTRACT

A method and system to help control body-shop processing of vehicles, based on timing of interaction with a touch-screen display. In an example implementation, a body shop will be equipped with a computing system including a touch-screen display, with the computing system being configured to manage presentation on the display of graphical representations of job-cards for individual body-shop jobs, such as individual vehicles in for repair. With such an arrangement, body shop personnel could drag and drop job cards from one section to another to indicate transitions of jobs between body-shop processing steps. The computing system will then advantageously make use of data regarding the timing of those drag-and-drop operations as a basis to control body-shop processing, such as be predicting a processing duration of a job currently in process and taking action to modify processing of the job based on the predicted duration for instance.

22 Claims, 5 Drawing Sheets

(51) Int. Cl.
*G06F 3/0488* (2013.01)
*G06F 3/0486* (2013.01)
*G06Q 10/06* (2012.01)
*G06Q 10/00* (2012.01)

(52) U.S. Cl.
CPC ......... *G06Q 10/0633* (2013.01); *G06Q 10/20* (2013.01); *G05B 2219/32128* (2013.01); *G05B 2219/34379* (2013.01); *G06F 3/0488* (2013.01); *Y04S 10/54* (2013.01)

(58) Field of Classification Search
USPC ....................................................... 700/100
See application file for complete search history.

(56) References Cited

U.S. PATENT DOCUMENTS

2015/0039522 A1\* 2/2015 Dillard ................... G06Q 10/20
705/305
2018/0005199 A1\* 1/2018 Abuelsaad ............. G06Q 10/20

OTHER PUBLICATIONS

Collision Services—Show Product, http://www.collisionservices.com, printed from the World Wide Web, printed Feb. 20, 2017.
Krista McNamara, "Building Blocks of Change," SearchAutoParts.corn, dated Aug. 8, 2013.
Anna Zeck, "Creating a Visual Production Board," dated Apr. 1, 2015.
Atlassian, "Documentation for JIRA Software 7.3," Jan. 13, 2017.

\* cited by examiner

METHOD AND SYSTEM FOR CONTROLLING BODY-SHOP PROCESSING

BACKGROUND

Modern auto body shops (e.g., collision-repair shops) typically work within a defined process for handling vehicle repair jobs, employing highly skilled technicians along the way to help restore vehicles to their original state.

In an example process, where a vehicle has been involved in an accident, the owner first reports the accident and files a claim with their insurance company, and the owner then brings the vehicle to a body shop and provides an insurance claim number to facilitate further processing. After checking-in the vehicle and receiving general insurance company approval, body-shop technicians then conduct an initial evaluation, which could include disassembly and detailed analysis of the vehicle and development of a repair plan and cost estimate, and possibly reassembly of the vehicle pending approval to proceed with repair work. Further, the body shop then requests, waits for, and receives insurance company approval for the repair work and cost. And upon receipt of insurance company approval, the body shop may then order any necessary parts and wait for delivery of the parts.

At a scheduled time, the body shop may then commence the repair work. For instance, technicians may again disassemble the vehicle if necessary and may engage in any required body reshaping and installing of exterior panels and other finishing pieces. Further, technicians may then seal and prepare (e.g., prime) any new panels and other parts for painting and may apply various coats of paint as necessary. In turn, technicians may then reassemble the vehicle and may then apply detailing, such as adding back or otherwise applying various moldings and other details if appropriate.

Throughout this process, the body shop may also need to use the services of other vendors to help with certain aspects of the repair work (such as glass repair and the like). Thus, at various stages, the vehicle could be in the hands of an outside vendor, as a sublet. Further, at various stages in the process, body-shop personnel may also need to be in touch with the insurance company and/or owner to obtain approval for unexpected work and charges, or for other reasons.

Once repair of the vehicle is finished, technicians may then engage in a quality control check to validate the repair work and to ensure that the vehicle drives appropriately. And the body shop may then communicate with owner to arrange for and provide delivery of the repaired vehicle.

Many variations on this body-shop process are possible as well.

OVERVIEW

In simplified terms, each vehicle subject to body-shop processing could constitute a respective "job" at the body shop. And at any given time, a given body shop could have many jobs being processed concurrently in various body-shop processing steps such as those noted above, with each job being handled by respective body-shop technicians or other personnel in various steps of the process.

Given the complexity of such an operation, a typical body shop could benefit from a system that helps manage its jobs, at least to provide body-shop personnel with a clear indication of which jobs are currently in which steps of the process and which jobs are being handled by which personnel, and to provide convenient access to information about each job, such as identification of customer name, vehicle make/model, insurance company, and the like.

One such management system is a large magnetic board that is divided into sections, such as columns, representing each step of body-shop processing, with magnetic cards representing respective jobs being positioned in applicable sections on the board. Each such magnetic card could have printed on it various attributes of a given job, such as a repair order number, customer name, make/model of vehicle, check-in date, expected completion date, insurance company name, and expected revenue/payment from insurance company. Further, each card could be labeled with colored stickers or other markings to indicate which technician is currently handling the job and/or to indicate various other status information.

With this system, when a job is being processed in a particular step of body-shop processing, the job's magnetic card can be placed on the board in the section representing that step. And when a job transitions from one step of the process to another, the job's magnetic card can be removed from its current section and placed on the section representing its new current step. Advantageously with this arrangement, body shop-personnel could conveniently view at a glance how many jobs are being processed in each step and perhaps which personnel are handing which jobs, thereby helping to manage processing of jobs.

Unfortunately, however, one piece of information that such a system does not account for is the timing of transition of jobs between the various steps of the process. While the magnetic board may allow a quick determination of where a job stands in the overall process, the magnetic board does not take into account the timing of when jobs move into and out of particular steps of the process and how long jobs are in particular steps of the process. Further, the magnetic board does not take into account such information as it may relate to various attributes of individual jobs, such as the relationship between the timing information and which personnel work on jobs in any given step, which make/model, customers, and/or insurance companies are involved, and what the expected revenue is of various jobs.

A system that takes such information into account in a technologically advanced and efficient manner could prove quite useful, helping to improve body-shop throughput and revenue and thus helping to enhance the overall body-shop processing experience.

Disclosed herein is a method and system configured to help achieve this goal. In accordance with the disclosure, a body shop will be equipped with a computing system including a large touch-screen display, with the computing system being configured to manage presentation on the display of graphical representations of job-cards for individual body-shop processing jobs. With such an arrangement, body shop personnel could drag and drop job cards from one section to another to indicate transitions of jobs between body-shop processing steps. And the computing system will advantageously make use of data regarding the timing of those drag-and-drop operations as a basis to control body-shop processing.

In a representative implementation, for instance, the computing system will present on the touch-screen display various discrete display sections, such as columns, labeled to represent respective body-shop processing steps. Further, for each job that is currently in process in the body shop, the computing system will present on the display a graphical representation of an associated job card, with the job card being positioned on the display within the display section that represents the job's current processing step. And the computing system will present, within each job card, various attributes of the job, such as repair order number, customer name, make/model of vehicle, in-date, expected out-date, insurance company, expected revenue, and, perhaps through color-coding or the like, identities of body-shop personnel handing or responsible for the job and/or other status information about or attributes of the job.

In practice, the computing system could maintain in data storage a record for each job currently in process, as well as a historical record for each completed job. Each such record could specify or otherwise indicate various attributes of the job, including but not limited to those noted above, for instance. Further, each such record could also include timing information related to processing of the job in particular body-shop processing steps, such as an indication, per step, of when the job entered into the step and when the job moved on to a next step or was completed.

With the touch-screen display arrangement, the computing system could determine and record this timing information based on data that indicates dragging and dropping of job cards on the touch-screen from one display section to another. In particular, when a job transitions from one body-shop processing step to another (e.g., when one step is completed and the job moves on to a next step for handling), body-shop personnel could drag and drop the job's card on the touch-screen display from the display section representing the job's old body-shop processing step to the display section representing the job's new body-shop processing step. And the computing system could receive data indicating this dragging and dropping of a particular job card and could accordingly add to the job's data record a timestamp of the transition, thus indicating when (e.g., date and time) the job was finished being processed in the old step and started to be processed in the new step, or was completed.

Based on this drag-drop timing information for many body-shop processing jobs handled over time, the computing system can thereby build up a large amount of data that represents how long particular jobs were being processed in particular body-shop processing steps. Further, because the data records indicate attributes of each job, the computing system could advantageously use this data as a basis to correlate particular job attributes or combinations of job attributes with particular durations of processing in particular body-shop processing steps. For instance, based on this drag-drop timing data, the computing system could establish trend-data that indicates how long particular body-shop processing steps tend to take for jobs having particular combinations of job attributes.

In accordance with the present disclosure, the computing system could then make use of this established trend-data as a basis to control the body-shop processing.

In an example implementation, for instance, by monitoring of the data records for jobs that are currently in process, the computing system could detect that a particular job that is in or entering a particular body-shop processing step has a particular combination of job attributes. And based on the trend-data established based on the drag-drop timing information, the computing system could then predict that a job having that particular combination of job attributes would likely have a particular duration in the particular body-shop processing step. Based on that prediction, the computing system could then take action to control the body-shop processing of the job.

For example, the computing system could determine that the job will take or is taking longer than desired or expected (e.g., longer than a predefined threshold duration and/or threshold longer than the representative duration that the trend-data indicates, based on the drag-drop timing information for a combination of the job's attributes), and the computing system could responsively (i) generate an alert indicating that the job will take or is taking longer than desired or expected, (ii) direct a change of body-shop personnel handling the job, and/or (iii) direct a transfer of the job to another body shop.

Further, as another example, the computing system could determine based on the trend-data how long a particular job having particular attributes is likely to take in some or all body-shop processing steps, and the computing system could thereby output a predicted completion date for body-shop processing of the job, which could help body-shop personnel manage the job and customer expectations.

Still further, as yet another example, the computing system could determine an optimal total duration of body-shop processing of a given job based on the insurance revenue expected for the job. And given that optimal duration, and the computing system could predict based on the trend-data, considering the job's combination of attributes, that the job will take longer than desired in one or more body-shop processing steps, and the computing system could responsively take actions like those noted above to change processing of the job.

In addition, this entire arrangement could be expanded to help control body-shop processing for multiple body shops (e.g., a chain of body shops and/or multiple body shops that arrange to participate in a pooled management service). Each such body could be equipped with a large touch-screen display as described above and perhaps with a local processing system. And a centralized (e.g., cloud-based) processing system could be communicatively linked with each body shop's touch-screen display and/or local processing system. With this arrangement, the central processing system and/or various local processing systems working in concert could build up trend-data based on drag-drop information as discussed above. Accounting for drag-drop information from multiple body shops, this trend-data could thus be quite useful, allowing for even further improved body-shop processing.

Accordingly, in one respect, disclosed is a method of controlling body-shop processing, in a scenario where body-shop processing of each of a plurality of vehicles includes a sequence of body-shop processing steps, and where body-shop processing of each vehicle defines a respective body-shop processing job having a plurality of job attributes.

In accordance with the disclosure, the method includes a computing system presenting, on a touch-screen display, a sequence of discrete display-sections representing, respectively, the sequence of body-shop processing steps, and, for each job currently being processed, presenting by the computing system on the touch-screen display, in the display-section that represents a current body-shop processing step of the job, a job-card that represents the job and that depicts at least some of the attributes of the job.

Further, the method includes the computing system receiving drag-drop data that represents instances of dragging and dropping on the touch-screen display of individual ones of the job-cards from one display-sections to another, where each instance of dragging and dropping of an individual job-card from one display-section to another indicates that body-shop processing of the job represented by the individual job card has transitioned from the body-shop processing step represented by the display-section from which the job-card was dragged to the body-shop processing step represented by the display-section to which the job-card was dragged.

Still further, the method includes the computing system determining, based on timing of the dragging and dropping represented by the received drag-drop data, durations of processing of individual jobs in particular body-shop processing steps, and the computing system establishing, based on correlations between the determined processing durations and the attributes of the individual jobs, trend-data indicating representative processing durations in particular body-shop processing steps for particular combinations of job attributes.

And yet further, the method includes the computing system using the established trend-data as a basis to control body-shop processing of a given job based on a determination by the computing system that the given job has a given combination of job attributes. For instance, the method could include the computing system taking actions such as those noted above.

Further, disclosed is a computing system for controlling body-shop processing, where body-shop processing of each of a plurality of vehicles includes a sequence of body-shop processing steps, and where body-shop processing of each vehicle defines a respective body-shop processing job having a plurality of job attributes. As disclosed, the computing system includes a touch-screen display, a processing unit, non-transitory data storage, and program instructions stored in the non-transitory data storage and executable by the processing unit to carry out operations for controlling body-shop processing of vehicles.

In line with the discussion above, the operations include causing to be presented on the touch-screen display, a sequence of discrete display-sections representing, respectively, the sequence of body-shop processing steps, and, for each of a plurality of jobs currently being processed, causing to be presented on the touch-screen display, in a display-section that represents a current body-shop processing step of the job, a job-card that represents the job and that depicts at least some of the attributes of the job.

Further, the operations include receiving drag-drop data that represents instances of dragging and dropping on the touch-screen display of individual ones of the job-cards from one display-section to another, wherein each instance of dragging and dropping of an individual job-card from one display-section to another that body-shop processing of the job represented by the individual job card has transitioned from the body-shop processing step represented by the display-section from which the job-card was dragged to the body-shop processing step represented by the display-section to which the job-card was dragged.

Still further, the operations include determining, based on timing of the dragging and dropping represented by the received drag-drop data, durations of processing of individual jobs in particular body-shop processing steps, and establishing, based on correlations between the determined processing durations and the attributes of the individual jobs, trend-data indicating representative processing durations in particular body-shop processing steps for particular combinations of job attributes.

And yet further, the operations include using the established trend-data as a basis to control body-shop processing of a given job based on a determination that the given job has a given combination of job attributes.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of a system in which features of the present disclosure can be implemented. As shown, the system includes a body shop 12 that operates to apply a set of body-shop processing steps 14, such as those noted above for instance, to repair vehicles 16. Shown within the body shop is then a body-shop control system (computing system) configured as discussed above, including a touch-screen display 18 and an associated processing unit 20, which could be integrated or communicatively linked together. By way of example, the display could be a 70 inch Newline TRUTOUCH interactive display or interactive whiteboard, including a capacitive touch panel and on-board computer, or could take any of a variety of other forms.

Figure 1:
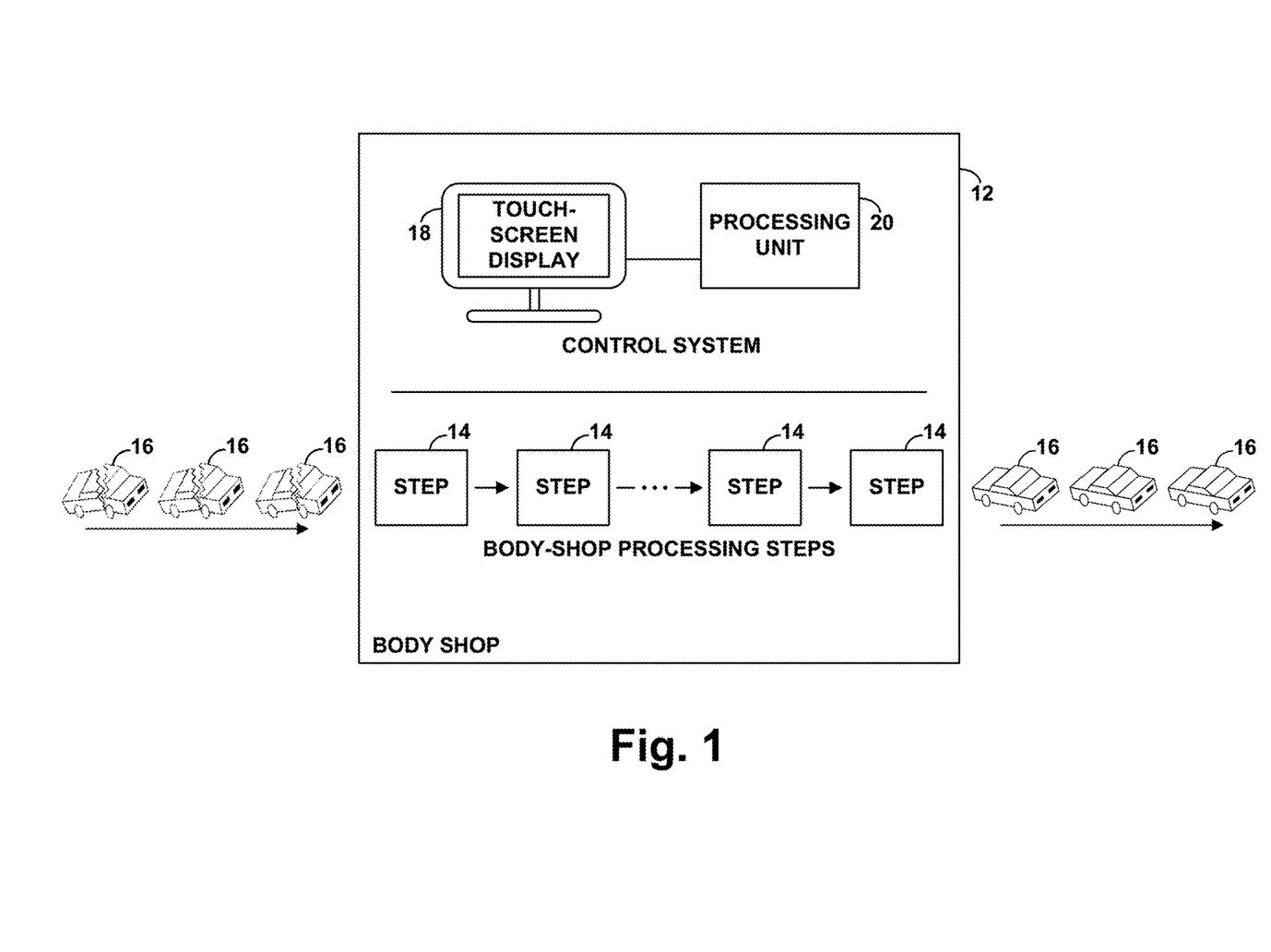
FIG. 1 is simplified depiction of a system in which the features of the present disclosure can be implemented.

In a representative system, the body shop could have one such touch-screen display and associated processing unit, positioned in an area that is accessible for viewing and use by body-shop personnel. Alternatively, the body shop could have multiple such touch-screen displays and other associated terminals (e.g. some large, and some as desktop terminals or handheld terminals (e.g., tablets or smartphones)), positioned conveniently in work areas and administrative offices for viewing and use, and each touch-screen display could have an associated processing unit (e.g., personal computer), possibly coupled via a communication network with a centralized server (e.g., network-based computer server). Control operations in accordance with the present disclosure could then be carried out by any of the individual processing units and/or the centralized server.

Figure 2:
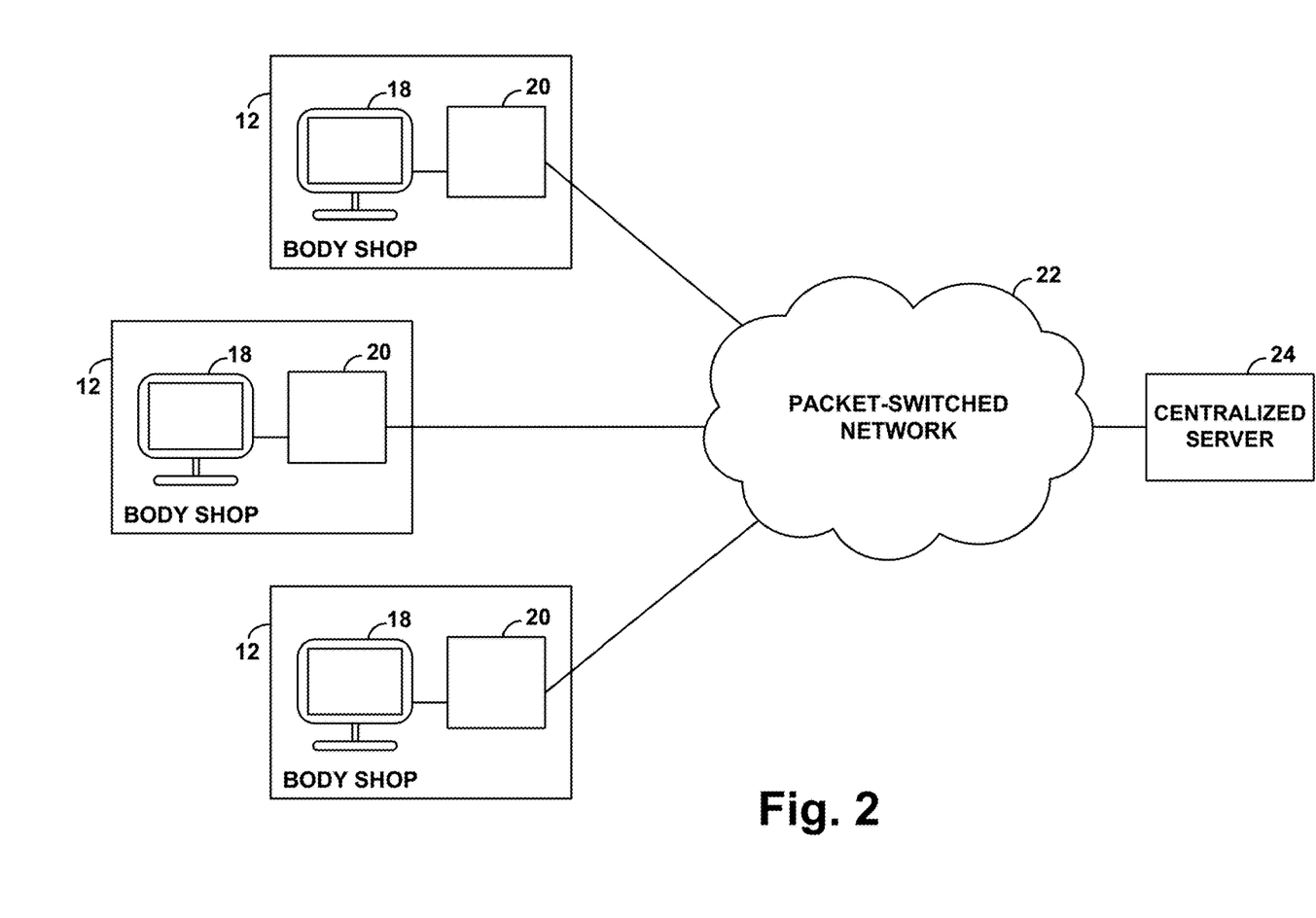
FIG. 2 is a simplified block diagram of cloud-based implementation in accordance with the disclosure.

FIG. 2 is next a simplified block diagram of a cloud-based implementation, which could conveniently serve one or more body shops, such as a chain of body shops for instance. As shown in FIG. 2, the cloud-based implementation is shown by way of example including three representative body shops 12, each including at least one touch-screen display 18 and an associated processing unit 20. The processing units of the various body shops are then shown sitting as nodes on a packet-switched network 22, such as the Internet, which provides connectivity in turn with a centralized server 24.

With this cloud-based arrangement, like that discussed above, control operations according to the present disclosure could be carried out by any the processing units and/or by the centralized server. Further, the cloud-based implementation could offer the advantage of establishing trend-data based on drag-drop timing on touch-screen displays at various shops, and allowing control actions such as directing the transfer of jobs from shop to shop to help manage body-shop processing load.

In line with the discussion above, a computing system operating in accordance with the present disclosure will present on the touch-screen display a sequence of display sections corresponding with a typical sequence of body-shop processing steps, and the computing system will present within each display section a graphical job card respectively for each job that is currently being processed in the associated step. As noted above, the display sections could be columns labeled per body-shop processing step. Alternatively, the display sections could be rows or could take various other forms. The display sections are preferably discrete, in that there sections are visually separate from each other to help distinguish their associated the steps, even if there is some extent of overlap or the like between them.

Figure 3:
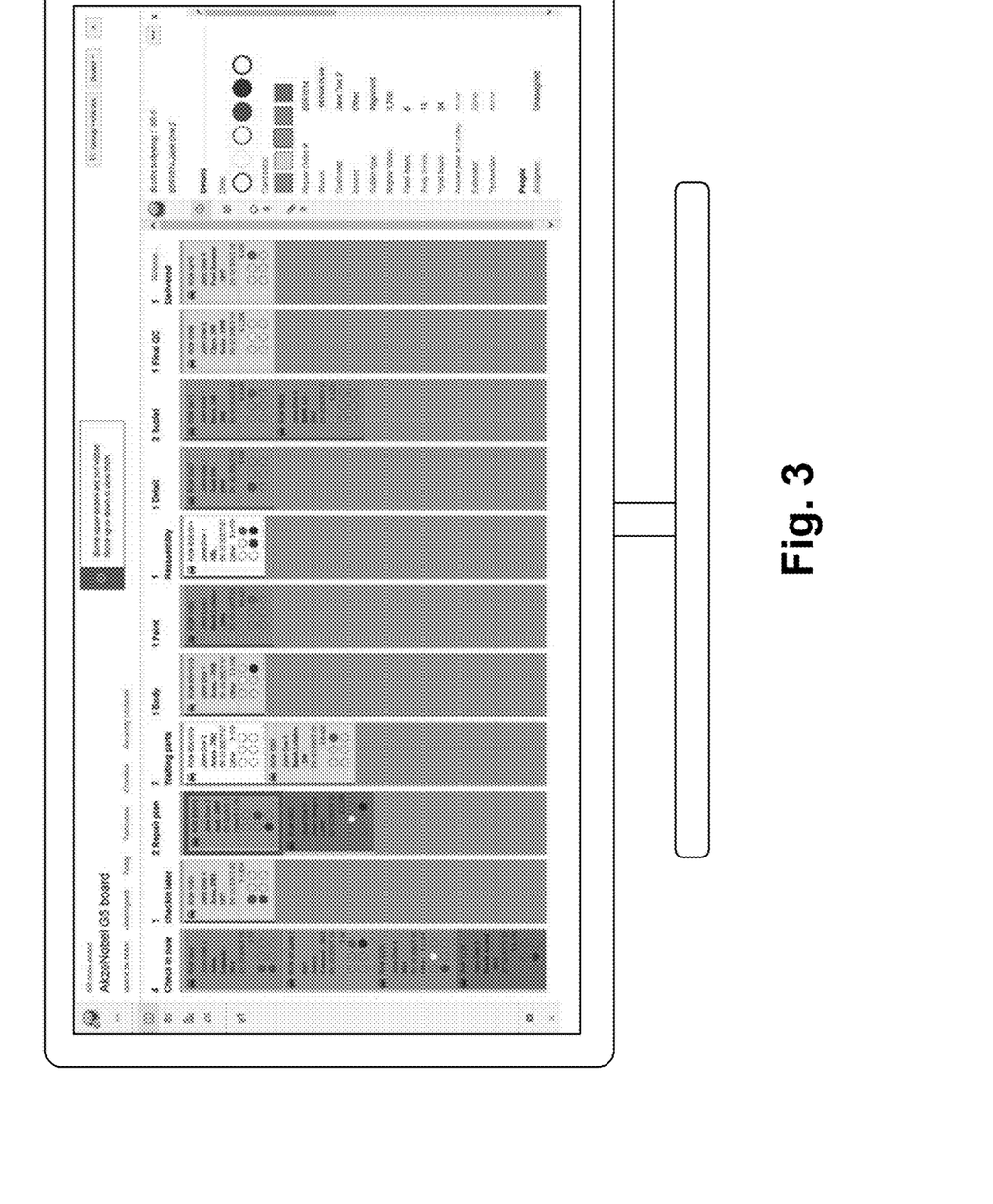
FIG. 3 is an illustration of an example graphical user interface on a touch-screen display, to help manage body-shop processing in accordance with the disclosure.

FIG. 3 depicts an example graphical user interface that the computing system could provide on the touch-screen display, to help manage body-shop processing as discussed above.

In the example arrangement of FIG. 3, the computing system presents the display sections as columns with headers corresponding with the body-shop processing steps discussed above. In particular, as shown, the example columns are labeled Check-In Now, Check-In Later, Repair Plan, Waiting Parts, Body, Paint, Reassembly, Detail, Sublet, and Final QC, and Delivered. In practice, there could be more, fewer, or different columns representing other body-shop processing steps. Further, the computing system could allow horizontal scrolling of the graphical user interface to reveal other columns representing other steps.

The computing system then presents within each column one or more job cards each representing respectively a job that is currently in process in the associated body-processing step. Each such job card could be a graphical object, shown by way of example as a rectangle, and could depict text and other graphics associated with the job represented by the card. In practice, the graphical user interface could allow each such job card to be dragged and dropped on the display from one column to another, representing a transition of the associated job from one body-shop processing step to another. To facilitate such dragging and dropping, the computing system could graphically snap cards to individual columns, so that when a user drags a card from one column to another, the card would automatically align into the new column. Further, the computing system could allow vertical scrolling of the graphical user interface, or of individual columns, to reveal other displayed cards.

Optimally, the computer system could color-code each card, and/or the text or other graphics on each card, in various was to conveniently represent the status and/or various attributes of the associated job. For example, the computing system could color code the background of each card with a color representing a body-shop technician (e.g., lead technician) responsible for or otherwise currently assigned to work on the job, so that a technician can conveniently identify their assigned jobs when looking at the display. Further, the computing system could display on each card one or more colored dots each representing a status or characteristic of the job, which could allow technicians to quickly ascertain such information at a glance from the display.

In the example graphical user interface, the computing system could depict within each job card various attributes of the associated job, such as representative attributes that are deemed to be of particular interest. For instance, as shown, the computing system could depict within each job card a repair order (RO) identification number, the customer name, the make/model of the vehicle, an IN date, an OUT date, the insurance company underwriting the repair, and the expected revenue (e.g., insurance company payment) for the repair.

In addition, the graphical user interface could be configured to allow a user to access more information, such as additional attributes, of individual jobs. For instance, the graphical user interface could be configured to allow a user to double-tap a card or to select a designated information button so as to access further information about the job and to respond to such user input by presenting in a sidebar section on the display (or in another manner, such as in a lightbox or pop-up) more specific information about the associated job as shown in the figure. In addition, the computing system could allow authorized editing of the job information, such as changing of job attributes, through this or another interface.

In a representative implementation as further discussed above, the computing system could maintain in data storage a record of each job currently in process in one or more body shops, as well as historical records of jobs that have been processed through completion. Each such job record could specify or otherwise indicate for the associated job various attributes of the job such as those noted above, for instance. In practice, the computing system could store these job records in a relational database structure or in any other form.

Much of the attribute data for a given job can result from user-entry of data into the computing system. For instance, when a vehicle initially enters the body-shop process, a technician or other body-shop personnel could create a repair order and could enter basic information, and body-shop personnel could update the job record upon determination of further job attributes, such as insurance revenue, assigned technician, body-shop processing status, and the like. Further, certain job attributes could be determined and recorded automatically or could be retrieved from another file system, database, or the like, through a push or pull process.

The computing system could thus use these stored job data records a basis to generate and present the job cards on the touch-screen display as discussed above. In particular, the computing system could generate and present a job card for each job currently in process, displaying the job card within the display section representing the associated job's current body-shop processing step, and color-coding and/or otherwise presenting as part of the job card various attributes of the associated job.

In accordance with the present disclosure, the computing system will optimally further include, as part of each job's record, information about the timing of transition of the job into and out of body-shop processing steps. By way of example, the record for each job could include respectively for each of a plurality of the body-shop processing steps (i) an in-timestamp indicating the date and time of entry of the job into the body-shop processing step and (ii) an out-timestamp indicating the date and time of exit of the job from the body-shop processing step. For each body-shop processing step that the job has not yet entered, these timestamps could be null. But for each body-shop processing step in which the job has entered, the job record could include an in-timestamp, and for each body-shop processing step from which the job has exited, the job record could include an out-timestamp.

As discussed above, the computing system could automatically establish this timestamp data for individual jobs based on dragging and dropping of the associated job cards between the display sections. In particular, when a job transitions in the body-shop process from one step to another, body-shop personnel could simply drag and drop the job's card on the touch-screen display from a display section representing the body-shop processing step in which the vehicle was being processed to the display section representing the body-shop processing step in which the vehicle is now being processed. And the computing system could thus receive touch-screen input data representing that dragging and dropping action and could responsively record one or more timestamps representing timing of the associated transition between body-shop processing steps. In particular, the computing system could record the current date/time as the job's out-timestamp for the old body-shop processing step, and the computing system could record the current date/time as the job's in-timestamp for the new body-shop processing step.

Further, once the computing system has determined a job's in-time and out-time for a given body-shop processing step, the computing system could compute and possibly record in the job's record a duration of processing of the job in that body-shop processing step, as the difference between the out-time and the in-time. Thus, ultimately for each job currently in process and for each completed job, the computing system could have a record of how long processing of the job took respectively in each body-shop processing step applied to the job, and the computing system could further have a record of the various attributes of the job, such as those noted above.

In addition, for each step in which a given job was processed, the computing system could include in the job's record an indication of how loaded that body-shop processing step was, such as how many jobs were in queue to be handled in that step at the time the given job was admitted into the step (e.g., put in queue for processing in the step). This or other such load information could help to provide additional context for how long it took to process the given job in the step.

In accordance with the present disclosure, the computing system could then make valuable use of this information as a basis to help control body-shop processing. In particular, the computing system could regularly establish and maintain trend-data based at least on the drag-drop timing information and job-attribute information, with the trend-data correlating representative processing durations (e.g., average durations, or typical duration ranges) in particular body-shop processing steps with particular combinations of job attributes. And the computing system could then use the established trend-data as a basis to predict and respond to bottlenecks in body-shop processing, to predict and report completion dates for individual jobs, to help optimize body-shop processing considering expected revenue, and to take other valuable actions.

In practice, the computing system could regularly evaluate the job records for current and past jobs, conducting a statistical analysis to find commonly occurring combinations of job attributes that tend to have similar processing durations. For instance, the computing system could determine that jobs being handled by a particular technician and involving a particular make/model of vehicle are statistically likely to take a particular duration (e.g., within a range of duration) for body work and are statistically likely to take another particular duration (e.g., within a range of duration) for paint work. And the computing system could determine that jobs involving a particular make/model of vehicle and a particular insurance company are statistically likely to take a particular duration (e.g., within a range) awaiting insurance approval. Other examples, as to other combinations of job attributes for instance, are possible as well.

Further, the computing system could take into account additional factors in establishing this trend data. For instance, the computing system could take into account the indicated level of load of a body-shop processing step at the time a job was admitted into that processing step, as a weighting or scaling factor in establishing the trend data based on duration of processing of the job in that step. For example, if a job having given attributes took a long time to be processed in a given body-shop processing step, but the step was highly loaded at the time the job was admitted into the step, the computing system might give less weight to that long duration, as the long duration could be more attributable to the load rather than the job attributes. The computing system could do this in various ways, such as by scaling down the indicated duration associated with the combination of job attributes. Other examples are possible as well.

The computing system could thus record this trend-data in data storage as indications of representative processing durations, per body-shop processing step, for particular combination of job attributes. Meanwhile, the computing system could then make use of this trend-data as a basis to control body-shop processing of jobs having particular combinations of attributes, based on the trend-data indications of likely durations for jobs with those combinations of attributes.

Figure 4:
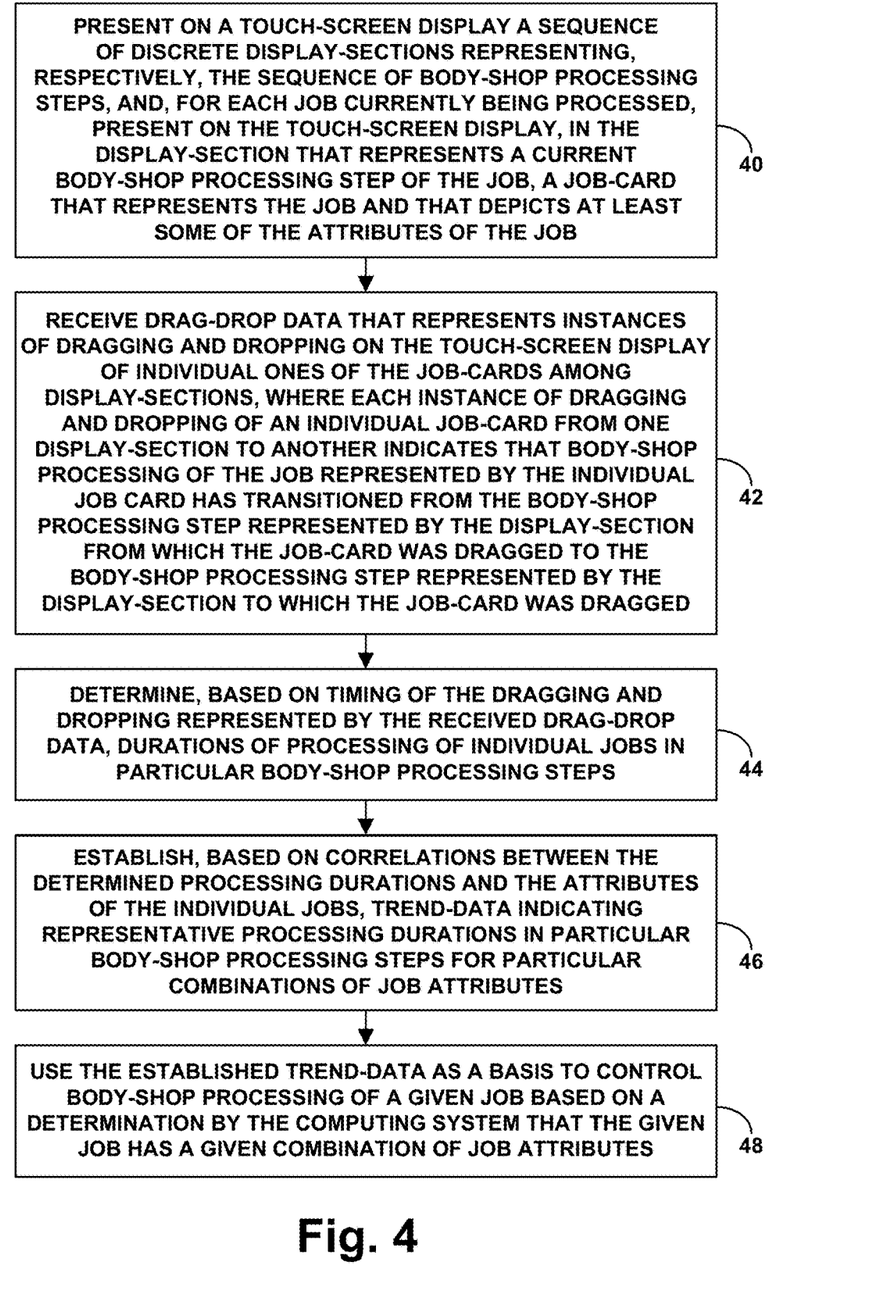
FIG. 4 is simplified block diagram of an example computing system operable in accordance with the disclosure.

FIG. 4 is next a flow chart depicting operations that can be carried out in accordance with an example method in line with the discussion above. This method can be carried out by a computing system as discussed above and/or by one or more other systems, to help control body-shop processing, in a scenario where body-shop processing of each of a plurality of vehicles includes a sequence of body-shop processing steps and where body-shop processing of each vehicle defines a respective body-shop processing job. Although features of this method are shown in order in FIG. 4, it will be understood that certain features could be carried out concurrently or in another order.

As shown in FIG. 4, at block 40, the example method includes the computing system presenting on a touch-screen display a sequence of discrete display-sections representing, respectively, the sequence of body-shop processing steps, and, for each job currently being processed, the computing system presenting on the touch-screen display, in the display-section that represents a current body-shop processing step of the job, a job-card that represents the job and that depicts at least some of the attributes of the job.

At block 42, the method further includes the computing system receiving drag-drop data that represents instances of dragging and dropping on the touch-screen display of individual ones of the job-cards among display-sections, where each instance of dragging and dropping of an individual job-card from one display-section to another indicates that body-shop processing of the job represented by the individual job card has transitioned from the body-shop processing step represented by the display-section from which the job-card was dragged to the body-shop processing step represented by the display-section to which the job-card was dragged.

At block 44, the method additionally includes the computing system determining, based on timing of the dragging and dropping represented by the received drag-drop data, durations of processing of individual jobs in particular body-shop processing steps. And at block 46, the method includes the computing system establishing, based on correlations between the determined processing durations and the attributes of the individual jobs, trend-data indicating representative processing durations in particular body-shop processing steps for particular combinations of job attributes.

At block 46, the method then further includes the computing system using the established trend-data as a basis to control body-shop processing of a given job based on a determination by the computing system that the given job has a given combination of job attributes.

In line with the discussion above, to facilitate implementing this method in practice, the computing system could maintain job-data that indicates respectively for at least each job currently in process the attributes of the job, and the job card that the computing system presents for each such job could depict on the display some or all of those attributes. Further, the computing system could record, in the job data (i.e., with or in association with the job data), timestamps based on the dragging and dropping. Thus, as discussed above, the act of the computing system determining the durations of processing based on timing of the dragging and dropping could be based at least on the recorded timestamps.

As discussed above, the act of the computing system using the drag-drop based trend-data as a basis to control body-shop processing of the given job based on the determination that the given job has the given combination of job attributes could then take various forms.

By way of example, the computing system could determine from the job record data that the given job has the given combination of job attributes and that the given job is in or entering a given body-shop processing step. (For instance, the computing system could make this determination in response to a drag-drop action moving the job's card into the display section representing the given body-shop processing step, or in response to regular monitoring or one or more other triggers.) Further, the computing system could determine based on the trend-data that the representative processing duration in the given body-shop processing step for the given combination of job attributes is longer than a predefined threshold duration.

Here, the predefined threshold duration could be a duration set through administrative configuration of the system to be a typically maximum tolerable duration in the given body-shop processing step, and/or the predefined duration could be set based on one or more other factors, such as current load of work in process or the like.

The computing system's determination that the representative duration in the body-shop processing step for the given combination of attributes thus amounts to a prediction (right or wrong) that the given job having that given combination of job attributes will take longer than the predefined threshold duration in the body-shop processing step, which could undesirable from a system throughput and user experience perspective. Given this, the computing system could thus take action to help control the body-shop processing of the job.

By way of example, the computing system could respond the determination that the representative processing duration in the given body-shop processing step for the given combination of job attributes is longer than the predefined threshold duration by generating and outputting various alerts or directives to control body-shop processing of the job. The computing system could provide such alerts or directives as pop-up messages on the touch-screen display and/or on other terminals that would be viewed by administrative personnel, technicians, or others, possibly maintaining presentation of the alerts or directives pending user action to help ensure user receipt and response to the alerts or directives. Alternatively or additionally, the computing system could provide such alerts or directive in other forms.

As an example, in response to determining that the representative processing duration in the given body-shop processing step for the given combination of job attributes is longer than the predefined threshold duration, the computing system could generate an alert signal that indicates a bottleneck condition. For instance, the computing system could provide a flashing alert on the touch-screen display or other terminal, indicating that the job at issue is likely to take longer than desired. Notably, such an alert could thus be provided before the job has taken longer than desired, as the computing system would have generated the alert based on the prediction that the computing system made based on the trend-data.

As another example, in response to determining that the representative processing duration in the given body-shop processing step for the given combination of job attributes is longer than the predefined threshold duration, the computing system could modify the body-shop processing of the given job.

For instance, the computing system could output a directive to body-shop personnel to change at least one technician working on the job. Here, for example, if the computing system has determined that the given combination of job attributes is specific to a particular technician (e.g., one who is too slow working on particular make/model vehicles or with other such job attribute(s)), the computing system could further determine from the trend-data that the combination of job attributes with another particular technician substituted for the currently assigned technician would not have a representative duration exceeding the threshold duration. Thus, the computing system could responsively direct that the job be reassigned to the other technician, to help avoid a bottleneck or threshold long processing situation, again based on a prediction that such a situation will occur.

Alternatively or additionally, in a multiple-body-shop arrangement, the computing system could output a directive to body-shop personnel to transfer the job from the current body-shop to another body shop. Here, the analysis could be similar. If the computing system has determined that processing of the job in the current body shop, e.g., with the body shop's technicians, in a particular body-shop processing step, will take longer than desired, but that processing of the job at another body shop will not take so long (e.g., considering current loads at the body shops), the computing system could direct that the job be transferred to the other body shop for handling. Again here, the computing system could thus advantageously take such action based on a prediction, given the drag-drop based trend data, that a problem situation will occur.

As another example, through an analysis similar to that described above, the computing system could determine that a given job has a given combination of job attributes and has so far been in a given body-shop processing step for a current duration that is threshold longer than the representative processing duration in the given body-shop processing step that the trend-data indicates for the given combination of job attributes. Based on this determination, the computing system could then responsively take similar actions, such as generating an alert indicating a bottleneck condition and/or modifying body-shop processing of the job, such as directing a change in at least technician working on the job and/or directing transfer of body-shop processing of the job from a first body shop to a second body shop.

As yet another example use of the trend-data as a basis to control body-shop processing of a given job based on a determination that the given job has a given combination of job attributes, the computing system could take into account the expected revenue (as an example job attribute) indicated for the job and could work to control processing of the job in an effort to achieve an optimal processing duration given that expected revenue.

For example, the computing system could determine the expected revenue that the job record indicates for the job, and the computing system could determine based at least in part on that expected revenue a desired body-shop processing duration for the job, overall or in a particular body-shop processing step. The determination of desired duration based on revenue could be based on a mapping of revenue to duration, to help achieve optimal profitability or the like; further, the determination of desired duration could take into account other factors as well, such as how busy the body-shop is currently, how important the job is for other reasons, and so forth.

Given the determined desired duration, the computing system could then use the drag-drop based trend-data as a basis to determine one or more changes to make in body-shop processing of the job to help achieve the desired processing duration of the job. For instance, as the computing system could determine that the job has a particular combination of attributes and could determine based on the trend data the representative duration in particular body-shop processing steps for a job having that combination of attributes. And the computing system could then determine that that representative duration is longer than the desired duration, given the expected revenue. In response, the computing system could thus take actions such as those noted above, perhaps directing reassignment of the job to another technician or body shop or the like.

Further, the computing system could engage in other useful actions to help control and manage body-shop processing based on the timing information that comes from the dragging and dropping of job cards as discussed above. Without limitation, for example, the computing system could predict and output an expected completion date of a given job. In particular, when a vehicle first enters body-shop processing and/or at various stages in the body-shop processing of the vehicle, the computing system could determine the attributes of the job and could predict how long it will take to complete a job having such attributes, in view of the representative processing durations of past jobs having similar attributes, and also taking into account characteristics of the body shop such as how loaded the body shop is currently. The computing system could then output an indication of the expected completion date, which could be presented as an attribute on the job card and could otherwise be communicated help manage administrative and customer expectations and the like. For instance, the computing system could output such a predicted completion date in response to an administrator's selecting of a "Prediction Completion Date" button on the touch-screen display or other terminal. Further, the computing system could use this or other such information as a basis to generate and provide a directive regarding whether to admit the job into body-shop processing or into particular steps of the process.

In addition, as discussed above, the computing system could carry out aspects of this process with respect to operations at multiple body shops. For instance, the computing system could present the sequence of discrete display-sections and job-cards on touch-screen displays at multiple body shops (presenting at each body shop job cards corresponding with jobs being processed at that body shop), and the computing system could receive drag-drop data that represents instances of the dragging and dropping at each of the multiple body shops. In that case, the computing system could then determine the durations or processing of jobs at each body shop, and the computing system could establish the trend-data based on body-shop processing at the multiple body shops.

Further, with this arrangement, the computing system could use the trend-data established based on body-shop processing at the multiple body shops as a basis to predict a completion data when body-shop processing of the job at issue will be completed, and the computing system could output a report of the predicted completion date. Thus, the predicted and reported overall duration body-shop processing of a given job having given attributes could be based on how long jobs having similar attributes have taken to complete not just at the same body shop but perhaps at multiple body shops. Also, a similar predictions and reporting could be carried out with respect to individual body-shop processing steps, perhaps as a basis to help control whether or when to admit certain jobs into certain body-shop processing steps or the like.

Figure 5:
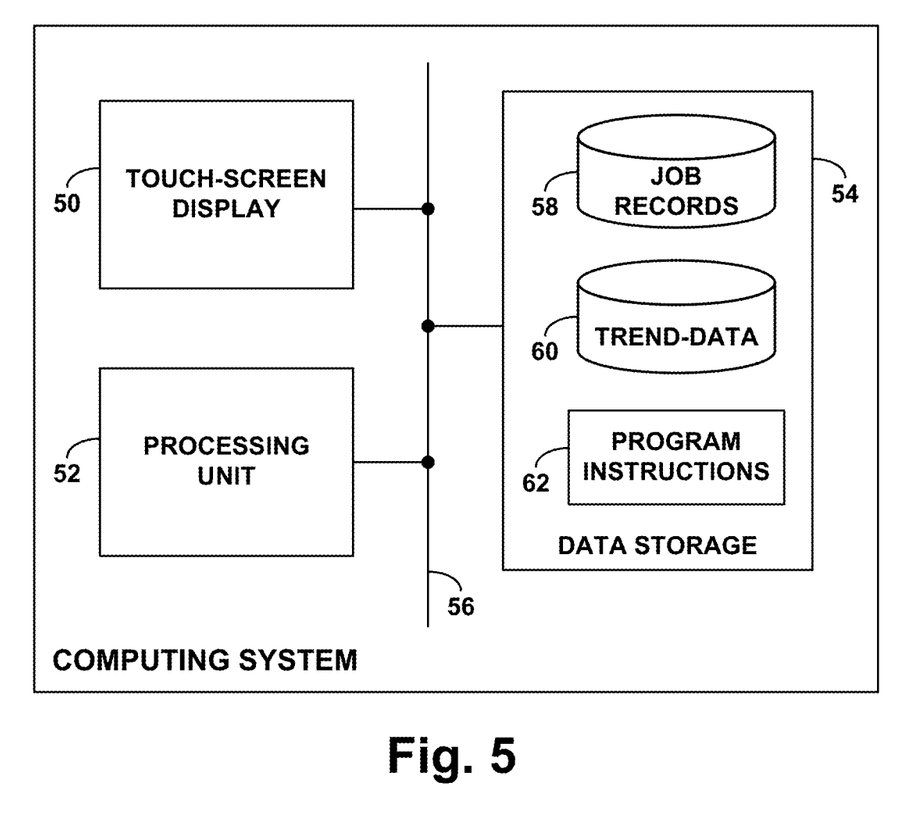
FIG. 5 is a flow chart depicting operations that can be carried out in accordance with the disclosure.

Finally, FIG. 5 is a simplified block diagram of an example computing system, showing some of the components that such a system could include in order to carry out features such as those noted above. As shown in FIG. 5, the example computing system includes a touch-screen display 50, a processing unit 52, and non-transitory data storage 54, all of which could be communicatively integrated together to some extent and/or could be linked together by a system bus, network, or other connection mechanism 56.

As noted above, the touch-screen display 50 could provide a capacitive touch-screen suitable for providing a graphical user interface as discussed above. The processing unit 52 could then comprise one or more general purpose processors (e.g., microprocessors) and/or one or more special purpose processors (e.g., application specific integrated circuits). And the data storage could comprise one or more volatile and/or non-volatile storage components, such as optical, magnetic, and/or flash storage.

As shown, the data storage could then include, in operation, job records 58, trend data 60, and program instructions 62. The job records could include data records for each job currently in being subject to body-shop processing as well as historical data for each completed job, including attributes of each job and including drag-drop timing data per job as discussed above. The trend data 60 could then comprise data derived by the computing system based on the job data, correlating various combinations of job attributes with representative processing durations in particular body-shop processing steps or combinations of such steps.

And the program instructions 62 could then be machine language instructions or the like, executable by the processing unit 52 to carry out operations such as those described above for controlling body-shop processing.

For instance, the operations could include causing the computing system to present (e.g., outputting for presentation) on the touch-screen display, a sequence of discrete display-sections representing, respectively, the sequence of body-shop processing steps, and, for each of a plurality of jobs currently being processed, causing the computing system to present on the touch-screen display, in a display-section that represents a current body-shop processing step of the job, a job-card that represents the job and that depicts at least some of the attributes of the job.

Further, the operations could include receiving drag-drop data that represents instances of dragging and dropping on the touch-screen display of individual ones of the job-cards among display-sections, where each instance of dragging and dropping of an individual job-card from one display-section to another that body-shop processing of the job represented by the individual job card has transitioned from the body-shop processing step represented by the display-section from which the job-card was dragged to the body-shop processing step represented by the display-section to which the job-card was dragged.

Yet further, the operations could include determining, based on timing of the dragging and dropping represented by the received drag-drop data, durations of processing of individual jobs in particular body-shop processing steps, and establishing, based on correlations between the determined processing durations and the attributes of the individual jobs, the trend-data indicating representative processing durations in particular body-shop processing steps for particular combinations of job attributes.

And yet further, the operations could include using the established trend-data as a basis to control body-shop processing of a given job based on a determination that the given job has a given combination of job attributes, as with the examples discussed above for instance.

Exemplary embodiments have been described above. Those skilled in the art will understand, however, that changes and modifications may be made to these embodiments without departing from the true scope and spirit of the invention.

We claim:

1. A method of controlling body-shop processing, wherein body-shop processing of each of a plurality of vehicles includes a sequence of body-shop processing steps, and wherein body-shop processing of each vehicle defines a respective body-shop processing job ("job") having a plurality of job attributes, the method comprising:

presenting by a computing system, on a touch-screen display, a sequence of discrete display-sections representing, respectively, the sequence of body-shop processing steps, and, for each job currently being processed, presenting by the computing system on the touch-screen display, in the display-section that represents a current body-shop processing step of the job, a job-card that represents the job and that depicts at least some of the attributes of the job;

receiving into the computing system drag-drop data that represents instances of dragging and dropping on the touch-screen display of individual ones of the job-cards among display-sections, wherein each instance of dragging and dropping of an individual job-card from one display-section to another indicates that body-shop processing of the job represented by the individual job card has transitioned from the body-shop processing step represented by the display-section from which the job-card was dragged to the body-shop processing step represented by the display-section to which the job-card was dragged;

determining by the computing system, based on timing of the dragging and dropping represented by the received drag-drop data, durations of processing of individual jobs in particular body-shop processing steps, and establishing by the computing system, based on correlations between the determined processing durations and the attributes of the individual jobs, trend-data indicating representative processing durations in particular body-shop processing steps for particular combinations of job attributes; and using by the computing system the established trend-data as a basis to control body-shop processing of a given job based on a determination by the computing system that the given job has a given combination of job attributes.

2. The method of claim 1, further comprising maintaining by the computing system job-data that indicates respectively for at least each job currently in process the attributes of the job.

3. The method of claim 2, further comprising recording by the computing system. in the job-data, timestamps based on the dragging and dropping, wherein determining by the computing system the durations of processing based on timing of the dragging and dropping is based at least on the recorded timestamps.

4. The method of claim 1, wherein using by the computing system the trend-data as a basis to control body-shop processing of the given job based on the determination that the given job has the given combination of job attributes comprises:

determining by the computing system that the given job has the given combination of job attributes and is in or entering a given body-shop processing step;

determining by the computing system based on the trend-data that the representative processing duration in the given body-shop processing step for the given combination of job attributes is longer than a predefined threshold duration; and responsive to at least the determining by the computing system that the representative processing duration in the given body-shop processing step for the given combination of job attributes is longer than the predefined threshold duration, generating by the computing system an alert signal indicating a bottleneck condition.

5. The method of claim 1, wherein using by the computing system the trend-data as a basis to control body-shop processing of the given job based on the determination that the given job has the given combination of job attributes comprises:

determining by the computing system that the given job has the given combination of job attributes and is in or entering a given body-shop processing step;

determining by the computing system based on the trend-data that the representative processing duration in the given body-shop processing step for the given combination of job attributes is longer than a predefined threshold duration;

responsive to at least the determining by the computing system that the representative processing duration in the given body-shop processing step for the given combination of job attributes is longer than the predefined threshold duration, modifying body-shop processing of the given job.

6. The method of claim 5, wherein modifying body-shop processing of the given job comprises an operation selected from the group consisting of (i) directing a change in at least one technician working on the job and (ii) directing transfer of body-shop processing of the job from a first body shop to a second body shop.

7. The method of claim 1, wherein using by the computing system the trend-data as a basis to control body-shop processing of the given job based on the determination that the given job has the given combination of job attributes comprises:

determining by the computing system that the given job has the given combination of job attributes;

determining a current duration that the given job has been in a given body-shop processing step;

determining by the computing system that the current duration is at least threshold longer than the representative processing duration in the given body-shop processing step that the trend-data indicates for the given combination of job attributes; and responsive to at least the determining by the computing system that the current duration is at least threshold longer than the representative processing duration in the given body-shop processing step that the trend-data indicates for the given combination of job attributes, taking at least one action selected from the group consisting of (i) modifying body-shop processing of the given job and (ii) generating an alert indicating a bottleneck condition.

8. The method of claim 7, wherein modifying body-shop processing of the given job comprises an operation selected from the group consisting of (i) directing a change in at least one technician working on the job and (ii) directing transfer of body-shop processing of the job from a first body shop to a second body shop.

9. The method of claim 1, further comprising:
using by the computing system the trend-data as a basis to predict a completion date when body-shop processing of the job will be completed; and
outputting by the computing system a report of the predicted completion date.

10. The method of claim 1, wherein the attributes of each job include an expected-revenue value for the job, and wherein using by the computing system the trend-data as a basis to control body-shop processing of the given job based on the determination that the given job has the given combination of job attributes comprises:
based at least in part on the expected-revenue value of the given job, determining by the computing system a desired processing duration for the given job; and
using by the computing system the trend-data as a basis to determine one or more changes to make in body-shop processing of the given job that would help achieve the desired processing duration of the given job.

11. The method of claim 1, further comprising the computing system color-coding each job-card on the touch-screen display, based on at least which of a plurality of technicians is assigned to work on the job represented by the job-card.

12. The method of claim 1, further comprising carrying out the presenting and receiving with touch-screen displays at multiple body shops, wherein the determining of durations of processing and establishing of the trend-data is based on body-shop processing at the multiple body shops.

13. The method of claim 12, further comprising:
using by the computing system the trend-data established based on body-shop processing at the multiple body shops as a basis to predict a completion date when body-shop processing of the job will be completed; and
outputting by the computing system a report of the predicted completion date.

14. A computing system for controlling body-shop processing, wherein body-shop processing of each of a plurality of vehicles includes a sequence of body-shop processing steps, and wherein body-shop processing of each vehicle defines a respective body-shop processing job ("job") having a plurality of job attributes, the computing system comprising:
a touch-screen display;
a processing unit;
non-transitory data storage; and
program instructions stored in the non-transitory data storage and executable by the processing unit to carry out operations for controlling body-shop processing of vehicles,
wherein the operations include causing to be presented on the touch-screen display, a sequence of discrete display-sections representing, respectively, the sequence of body-shop processing steps, and, for each of a plurality of jobs currently being processed, causing to be presented on the touch-screen display, in a display-section that represents a current body-shop processing step of the job, a job-card that represents the job and that depicts at least some of the attributes of the job,
wherein the operations further include receiving drag-drop data that represents instances of dragging and dropping on the touch-screen display of individual ones of the job-cards among display-sections, wherein each instance of dragging and dropping of an individual job-card from one display-section to another indicates that body-shop processing of the job represented by the individual job card has transitioned from the body-shop processing step represented by the display-section from which the job-card was dragged to the body-shop processing step represented by the display-section to which the job-card was dragged,
wherein the operations further include determining, based on timing of the dragging and dropping represented by the received drag-drop data, durations of processing of individual jobs in particular body-shop processing steps, and establishing, based on correlations between the determined processing durations and the attributes of the individual jobs, trend-data indicating representative processing durations in particular body-shop processing steps for particular combinations of job attributes, and
wherein the operations further include using the established trend-data as a basis to control body-shop processing of a given job based on a determination that the given job has a given combination of job attributes.

15. The computing system of claim 14, wherein the operations further comprise:
maintaining, in the non-transitory data storage, job-data that indicates respectively for at least each job currently in process the attributes of the job; and
recording, in the job-data, timestamps based on the dragging and dropping,
wherein determining the durations of processing based on timing of the dragging and dropping is based at least on the recorded timestamps.

16. The computing system of claim 14, wherein using the trend-data as a basis to control body-shop processing of the given job based on the determination that the given job has the given combination of job attributes comprises:
determining that the given job has the given combination of job attributes and is in or entering a given body-shop processing step;
determining based on the trend-data that the representative processing duration in the given body-shop processing step for the given combination of job attributes is longer than a predefined threshold duration; and
responsive to at least the determining that the representative processing duration in the given body-shop processing step for the given combination of job attributes is longer than the predefined threshold duration, generating an alert signal indicating a bottleneck condition.

17. The computing system of claim 14, wherein using the trend-data as a basis to control body-shop processing of the given job based on the determination that the given job has the given combination of job attributes comprises:
- determining that the given job has the given combination of job attributes and is in or entering a given body-shop processing step;
- determining based on the trend-data that the representative processing duration in the given body-shop processing step for the given combination of job attributes is longer than a predefined threshold duration; and
- responsive to determining that the representative processing duration in the given body-shop processing step for the given combination of job attributes is longer than the predefined threshold duration, modifying body-shop processing of the given job.

18. The computing system of claim 17, wherein modifying body-shop processing of the given job comprises an operation selected from the group consisting of (i) directing a change in at least one technician working on the job and (ii) directing transfer of body-shop processing of the job from a first body shop to a second body shop.

19. The computing system of claim 14, wherein the operations further include:
- using the trend-data as a basis to predict a completion date when body-shop processing of the job will be completed; and
- outputting a report of the predicted completion date.

20. The computing system of claim 14, wherein using the trend-data as a basis to control body-shop processing of the given job based on the determination that the given job has the given combination of job attributes comprises:
- determining that the given job has the given combination of job attributes;
- determining a current duration that the given job has been in a given body-shop processing step;
- determining that the current duration is at least threshold longer than the representative processing duration in the given body-shop processing step that the trend-data indicates for the given combination of job attributes; and
- responsive to determining that the current duration is at least threshold longer than the representative processing duration in the given body-shop processing step that the trend-data indicates for the given combination of job attributes, modifying body-shop processing of the given job.

21. The computing system of claim 20, wherein modifying body-shop processing of the given job comprises at least one operation selected from the group consisting of (i) directing a change in at least one technician working on the job and (ii) directing transfer of body-shop processing of the job from a first body shop to a second body shop.

22. The computing system of claim 14, wherein the attributes of each job include an expected-revenue value for the job, and wherein using the trend-data as a basis to control body-shop processing of a given job based on a determination that the given job has a given combination of job attributes comprises:
- based at least in part on the expected-revenue value of the given job, determining a desired processing duration for the given job; and
- using the trend-data as a basis to determine one or more changes to make in body-shop processing of the given job that would help achieve the desired processing duration of the given job.

* * * * *